June 3, 1930.  H. SCHWARZE  1,761,937
HEADLAMP MOUNTING
Filed Feb. 8, 1929
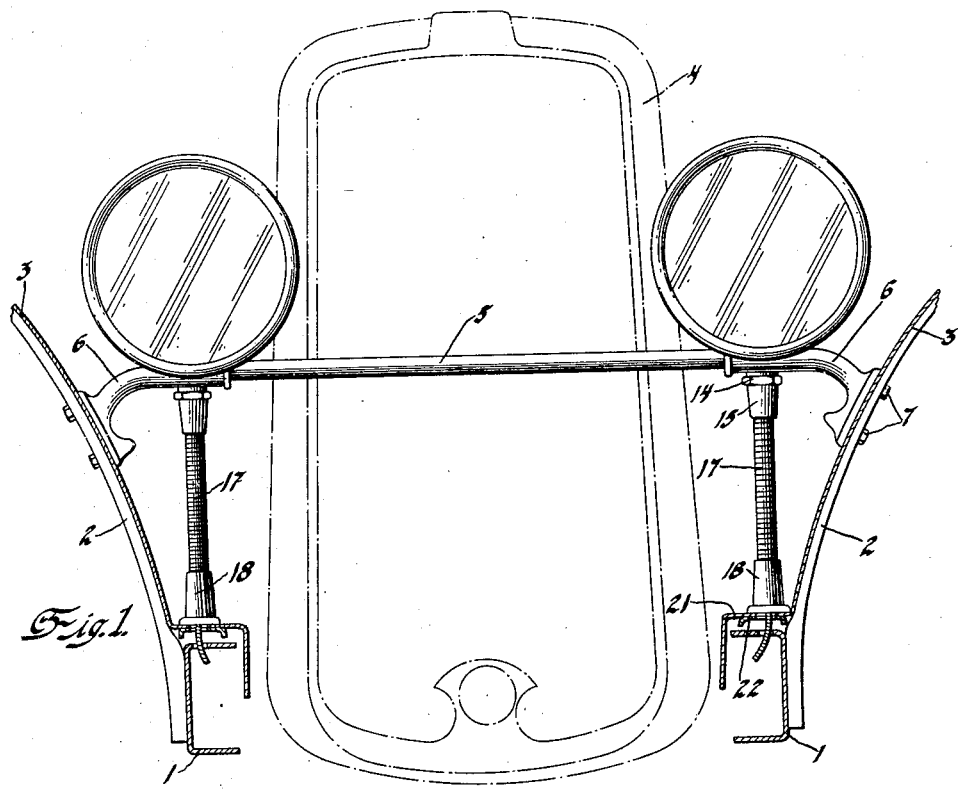
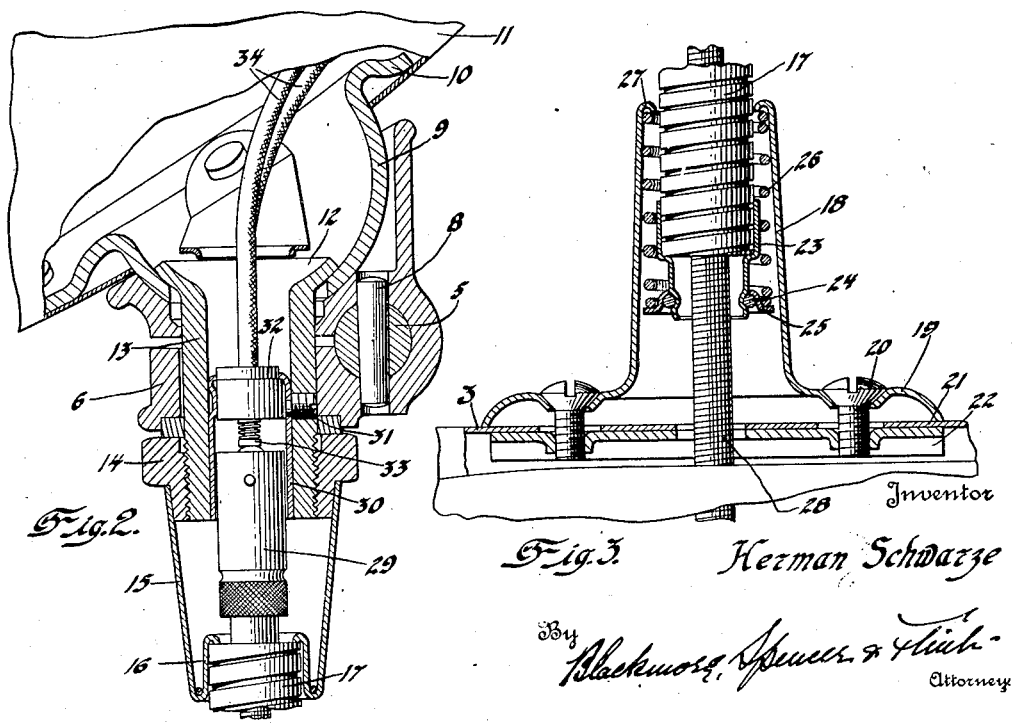
Inventor
Herman Schwarze
Attorney Patented June 3, 1930

1,761,937

UNITED STATES PATENT OFFICE

HERMAN SCHWARZE, OF BIRMINGHAM, MICHIGAN, ASSIGNOR TO GENERAL MOTORS CORPORATION, OF DETROIT, MICHIGAN, A CORPORATION OF DELAWARE

HEADLAMP MOUNTING

Application filed February 8, 1929. Serial No. 338,410.

This invention relates to an improvement in headlamp assemblies, and is particularly intended for use on motor vehicles wherein the headlamps are supported on a fender brace or tie rod extending between the two fenders at the front of the vehicle.

It is among the objects of the invention to provide an improved connection for mounting the headlamps on the supporting fender brace, or other similar bracket, and to provide a conduit, preferably in the form of a vertical cable or post, for concealing the current conducting wires leading to the lamp filaments, which conduit serves the purpose of hiding unsightly wires and lends a certain ornamental effect to the front of the vehicle.

A further object is to provide a construction which will permit easy and quick initial assembly, as well as the subsequent disassembly and reassembly for the purpose of inspection, adjustment or repair.

Other objects and advantages will become apparent during the course of the following specification, when taken in connection with the accompanying drawing illustrating a preferred embodiment of the invention, and wherein Fig. 1 is a front elevation of the headlamp assembly.

Fig. 2 is a transverse sectional view of the headlamp mounting and upper end of the cable, and Fig. 3 is a transverse sectional view showing the fastening means for the lower end of the conduit.

Referring to the drawing, the reference character 1 indicates a pair of longitudinally extending, channel-shaped chassis frame members to each of which is secured an upwardly and outwardly extending bracket 2 for the usual fenders or mud guards 3. Extending transversely of the vehicle and forward of the radiator 4, is a tie bar or brace rod 5 having at each end a bracket 6 secured as by means of bolts 7, to the fender bracket 2. The inner end of each bracket 6 is split and formed with a circular opening into which extends the end of the tie rod 5, the rod being held in place by means of a tapered pin or key 8. On the upper face of the bracket 6 is formed a concave seat or socket into which is fitted a hollow semi-spherical member 9 having an out-turned flange 10 at its upper end which is preferably riveted, or otherwise secured on the inside of the lamp housing 11. Within the hollow member 9 is an outwardly flared or flanged portion 12 of a dependent sleeve or tube 13 projecting through an opening in the bracket 6, and secured in place by nut 14, screw-threaded on its lower end. The outwardly flared portion 12, and the socket or concave depression in the upper face of the bracket 6 form a universal mounting for the member 9 clamped therebetween and which, therefore, permits the adjustment of the lamp in any direction to be readily effected. Brazed, welded, or otherwise secured on the nut 14 is a sleeve 15 which in this instance is formed from sheet metal and has a reversely bent upstanding portion 16 secured as by welding, soldering, or the like, on the upper portion of a flexible cable or conduit 17.

The cable 17 preferably extends in a vertical direction and has its lower end projecting into an upstanding tubular element 18 provided with a base 19 that is secured as by screws or bolts 20 passing through the hood ledge or flange 21 of the fender 3, and having threaded engagement with a reinforcing or stiffening plate 22 on the under side of the hood ledge 21. A sheet metal cylinder 23 on the lower end of the cable 17 has an annular depression in which is seated a ring 24 to hold in place a washer 25 forming a seat for a tensioned coil spring 26 that bears at its opposite end against an inturned annular flange 27 at the top of the tubular element 18. The tension of the coil spring 26 affords a yielding connection which prevents rattle and also exerts a downward pull on the cable to maintain it in a vertical line.

Extending upwardly through the cable 17 is a conduit 28, enclosing one or more electric current-conducting wires leading from a suitable control switch conveniently located adjacent the driver's seat and having connection with a connector plug 29 of a well known type. The plug 29 preferably has a bayonet slot or other similar quickly detachable connection with a sleeve 30 secured in the tube 13 by a set screw 31, and which carries an insulating body 32 for the terminals 33 secured to the ends of current-conducting wires 34 that lead upwardly into the lamp housing, and are suitably connected with the lamp bulb socket.

In assembling the lamp on the mounting the dependent tube 13 is inserted in the opening of the bracket 6, and the plug 29 is connected with the sleeve in order to establish electrical communication from the control switch to the lighting filaments. The nut 14, and with it the conduit 17, is then lifted and threaded onto the end of the tube 13 and drawn tight with the lamp adjusted to the proper angle. The unsightly wires are thus entirely concealed from view.

In the event it later becomes necessary to readjust the lamp or to get access to the current-conducting wires for any reason, the assembly procedure is reversed, as will be obvious. When the nut 14 is removed from the tube 13, the conduit is allowed to drop until its lower end rests upon the hood ledge 21, which, together with the flexibility of the conduit, affords ample room for the manipulation of the connector plug 29.

It is to be noted that the removal of either headlamp or the loosening of the adjusting nuts 14 to effect headlamp adjustment does not affect the connection between the lamp brackets and tie rod nor allow at such times the to sag or spread apart, since at such times the tapered pin 8 holds the tie rod in the brackets. Thus the length of the assembly and the relation of the fenders is maintained, which materially simplifies the adjustment operation as no attention need be given to the proper spacing and bracing of the fenders.

In order to effect a pleasing contrast, the fender brace may be painted black or given a dull finish, and the conduit or post 17 given a bright finish or high polish. This arrangement materially enhances the decorative effect and affords an appearance of exceptional sturdiness to the front of the vehicle. To the casual observer viewing the car at a distance the impression is had of two lamps supported wholly upon vertical posts.

Although the construction has been described more or less specifically, it will be understood that the invention is not limited to the exact details mentioned, but that various modifications, such as come within the scope of the appended claims, may be readily made.

I claim:

1. In a headlamp mounting for vehicles, wherein a tie bar connecting the fenders supports the lamps, a dependent tube on a lamp extending through a portion of the tie bar, a quick detachable coupling for the conductors of energy to the light element, carried by said dependent tube, a protective casing for the conductors, having means for attachment with the tube to hold the lamp in place and prevent access to the coupling.

2. In a vehicle headlamp mounting, a support, a dependent hollow element on the lamp extending through the support, a substantially vertical conduit having its upper end detachably connected with said hollow element, current-conducting wires concealed within the conduit and hollow element, and a detachable coupling between the wires adjacent the detachable connection of the conduit and element, whereby access may be had to the coupling when said connection is broken.

3. In a vehicle headlamp mounting, a support, a dependent hollow tube on the lamp extending through the support, a conduit, means engageable with the tube to hold the lamp in adjusted position and connect the conduit in alignment with the tube, and current-conducting wires concealed within the conduit and tube and leading to the lighting element of the lamp.

4. In a vehicle headlamp mounting, a support, a lamp having a dependent tubular element extending through an opening in the support, a conduit, means engageable with the tubular element to hold the lamp in adjusted position and connect the conduit in alignment with the tubular element, current-conducting wires concealed within and leading through the conduit and tubular element to the lamp, and a member having an opening into which the end of the conduit telescopically projects.

5. The structure of claim 5 and an elastic element exerting its tension against the end of the conduit.

6. The structure of claim 5 wherein the conduit consists of a flexible cable and a spring carried by the member with which the conduit telescopes bears on the cable to retain it in the member and resist flexing thereof.

7. In a vehicle headlamp mounting, a support, a lamp supported thereby, a conduit leading to the lamp and concealing therein the current conductors, a sleeve telescopically surrounding the lower end of the conduit, and a spring located within the sleeve and exerting its tension on the lower end of the conduit.

8. In a headlamp mounting for vehicles, a support for the lamp, a dependent tube on the lamp projecting through the support, a flexible cable having at its upper end a connector for attachment with the tube, and forming with the tube a hollow conduit for concealing the current-conducting wire leading to the light element of the lamp, and means to hold the lower end of the cable in place including a tubular element into which the lower end of the cable projects, and an elastic element interposed under tension between seats formed on the tube and cable respectively.

9. In a headlamp mounting, a fender bracket having a hollow split end, a tie bar projecting into the hollow end of the bracket, a pin extending through aligned apertures in the bracket and tie bar, a headlamp having a dependent hollow portion projecting through the split end of the bracket, current conducting wires leading through said hollow portion to the interior of the lamp, a conduit for concealing said wires having an adjustable attachment element for engagement with said hollow portion and adapted by its adjustment to secure the lamp on the bracket and contract said split end about the tie bar.

In testimony whereof I affix my signature.

HERMAN SCHWARZE.